United States Patent [19]

Lendl

[11] 4,174,182

[45] Nov. 13, 1979

[54] NEEDLE PRINTING HEAD

[75] Inventor: Josef Lendl, Ottensoos, Fed. Rep. of Germany

[73] Assignee: Triumph Werke Nurnberg A.G., Nuremberg, Fed. Rep. of Germany

[21] Appl. No.: 891,607

[22] Filed: Mar. 30, 1978

[30] Foreign Application Priority Data

Apr. 15, 1977 [DE] Fed. Rep. of Germany ....... 2715617

[51] Int. Cl.$^2$ .......................... B41J 3/12; H02K 49/00

[52] U.S. Cl. ...................................... 400/124; 310/328

[58] Field of Search ...................... 400/124; 101/93.05; 310/328; 74/531

[56] References Cited

U.S. PATENT DOCUMENTS

| | | | |
|---|---|---|---|
| 2,683,410 | 7/1954 | Wockenfuss et al. | 101/93.05 |
| 3,215,244 | 11/1965 | Hickerson | 400/81 |
| 3,454,206 | 7/1969 | Williams | 310/331 X |
| 3,715,020 | 2/1973 | Nordin | 400/124 |

FOREIGN PATENT DOCUMENTS

| | | | |
|---|---|---|---|
| 2458809 | 6/1976 | Fed. Rep. of Germany | 400/124 |

*Primary Examiner*—Paul T. Sewell

*Attorney, Agent, or Firm*—Brian L. Ribando

[57] ABSTRACT

A plurality of printing needles forming an array are mounted in a printing head and are periodically driven to impact a printing ribbon onto a recording medium. The printing head contains a brake for each needle so that selected needles can be prevented from striking the printing ribbon allowing the formation of a desired character matrix pattern on the recording medium. Each brake may be driven by a piezoelectric element.

7 Claims, 5 Drawing Figures

Fig_1
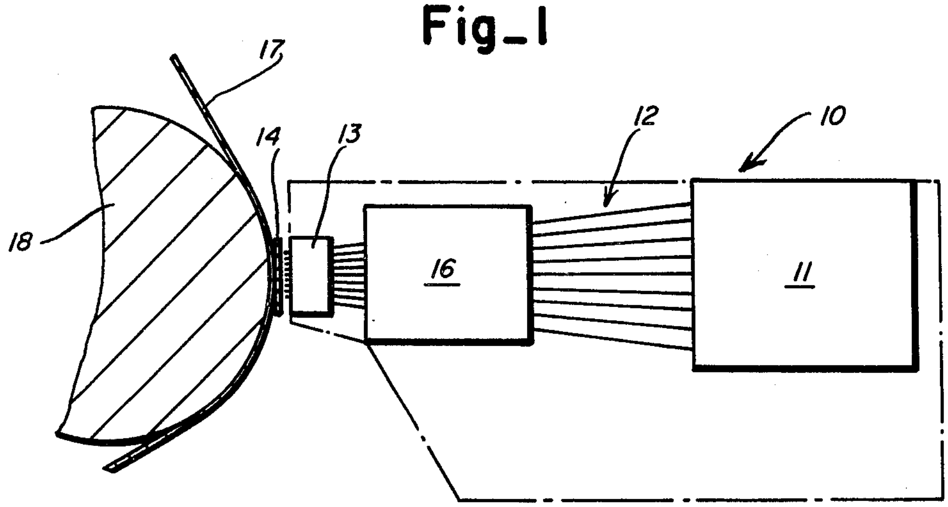
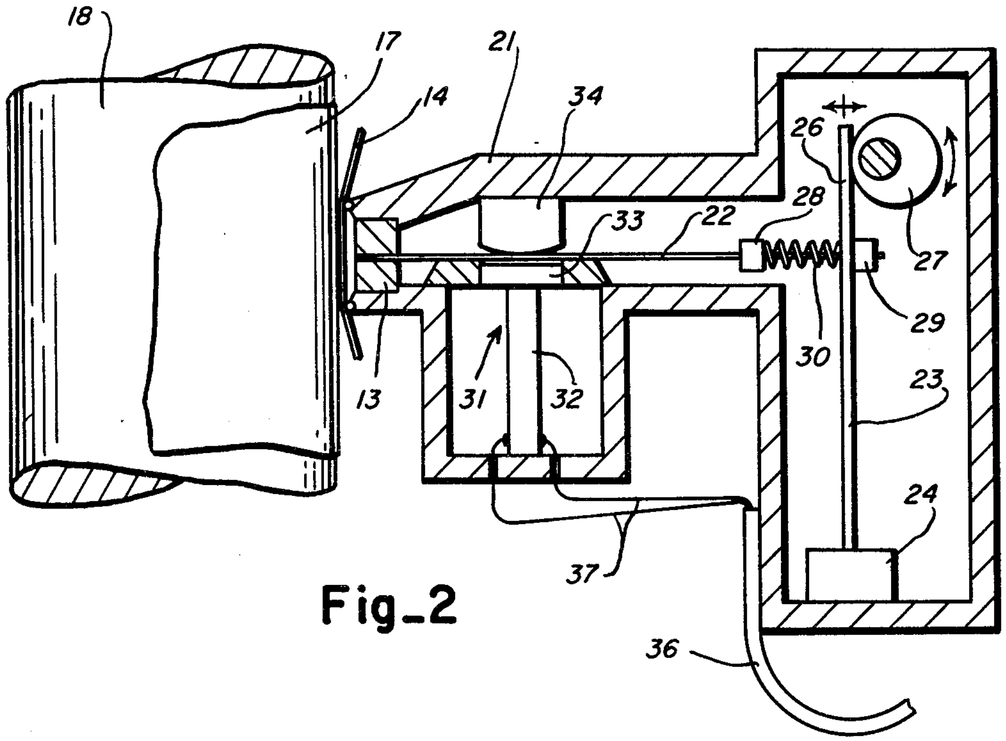
Fig_2

NEEDLE PRINTING HEAD

BACKGROUND OF THE INVENTION

The invention relates to a needle printing head, and more particularly, to a printing head in which selected printing needles can be prevented from printing by friction brakes.

In known prior art wire or needle printers, a printing mechanism is used whereby each symbol is composed of several individually printed points wherein the printing is done in a point raster style. Each single printed point is produced by a printing element which must be selected and made to print according to the element's position within the symbol raster. For this purpose, appropriately designed drive devices may be used, which devices are controlled by means of electronic circuitry.

German patent application 24 58 809 shows a printing unit in which control of the individual printing elements of the print mechanism is effected through the use of electromagnetic transducers. Braking means are provided for each of the printing elements and the said means are individually controllable so that selected patterns of the same may be used to lock selected printing elements in a given position in the mechanism. The various means includes mechanical-type locks, magnetic element locks and electrostatic element locks. Printing is accomplished by movement of a rotary drum towards the printing elements wherein a recording medium is trapped therebetween. Those printing elements which have been locked in place by the appropriate means bear on the recording medium in order to effect the printing thereon, while those elements which have not been locked in place are displaced by the movable drum and do not bear with sufficient pressure upon the recording medium to cause a point to be printed. The movement of the backing drum toward the printing needles is one which is effected only through the use of a great amount of power, and necessarily cannot be done with sufficient rapidity in order to achieve satisfactory results.

U.S. Pat. No. 3,715,020 issued Feb. 6, 1973 to Nordin discloses a wire element printing mechanism in which a vertical array of printing elements is selectively braked in order to produce a desired pattern. In the Nordin patent, each printing wire is disposed in a semi-rigid sleeve, and an array of brakes are arranged so as to be in a position to selectively bear on one end of each of the sleeves. When a given sleeve is clamped by means of the brake, a force on one end of the printing wire will cause the other end thereof to protrude from the sleeve and to produce a print mark. When the sleeve is not restrained by means of the brake, the same force applied to one end of the print wire results in a displacement of the wire and the sleeve from its normal rest position, but the wire is not caused to further protrude from the other sleeve end and no printing takes place.

There is a need in the prior art for a printing mechanism in which a plurality of printing wires are arranged in a matrix array and in which individual brakes are provided for each of the printing wires so that upon receipt of a printing force by the wire, the condition of the brakes will be determinative of whether or not a print mark will be made to appear on a recording medium.

SUMMARY AND OBJECTS OF THE INVENTION

A plurality of printing needles are arranged in a vertical array in a printing head which may be made to scan a recording medium. The printing needles are periodically driven by a suitable mechanism to impact a printing ribbon onto the recording medium in order to cause a pattern to be printed thereon. The printing head contains an array of brakes, one for each of the printing needles, and the individual brakes are selectively actuatable so that desired printing needles can be retained by the brake and prevented from impacting the printing ribbon. Each brake may be actuated by a piezoelectric element which elongates or bends when a suitable signal is supplied thereto.

It is thus an object of the invention to provide a needle printing head comprising an array of printing needles and an array of individual braking elements.

It is another object of the invention to provide a needle printing head in which an array of printing needles is selectively braked by an array of braking elements in order to prevent selected ones of the needles from being driven onto a printing ribbon.

It is a further object of the invention to provide a needle printing head comprising an array of printing needles which are periodically driven to a printing ribbon, which needles may be selectively braked by means of an array of braking elements in order to form a desired character matrix pattern on a recording medium.

These and other objects of the invention will become apparent from the following detailed description taken in conjunction with the accompanying drawing figures in which like reference numerals designate like or corresponding parts throughout the figures.

BRIEF DESCRIPTION OF THE DRAWING

FIG. 1 is a diagrammatic view of a needle printing head according to the invention;

FIG. 2 is a top sectional view of a needle printing head;

DESCRIPTION OF THE PREFERRED EMBODIMENT

Figure 4:
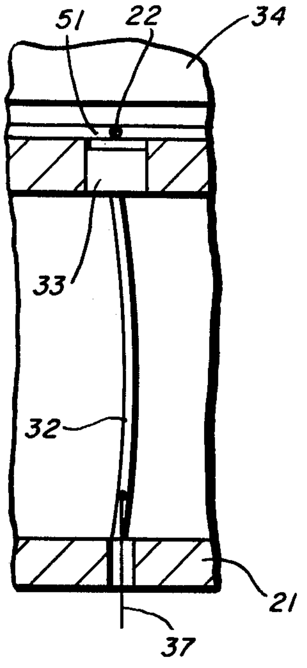
FIGS. 4 and 5 are end views of a needle printing wire and a brake mechanism associated therewith.

Referring now to the drawing, there is shown in FIG. 1 a needle printing head generally designated by the reference numeral 10. The printing head contains a needle driver 11 and projecting from the needle driver 11 is an array of print needles 12. The print needles 12 pass through a needle guide 13 in one end of the housing and project therefrom in the direction of a printing ribbon 14. Between the needle guide 13 and the needle driver 11 is a clamping device 16 through which the print needles of the array 12 pass. Adjacent the printing ribbon 14 is a recording medium 17. The recording medium is backed and supported by a member 18 which may comprise a cylindrical platen.

Turning now to FIG. 2, the various elements of the needle printing head may be seen with greater particularity. The printing head comprises a housing 21 which surrounds and protects the various components which are therein. A single print wire 22 is shown, and this print wire extends from an oscillating tongue 23 to the needle guide 13. The print wire 22 passes through an aperture or is otherwise slidably attached to the tongue 23 at a point between a fixed end 24 of the tongue and a free end 26. Adjacent the free end 26 is an oscillator 27 which acts to drive the tongue 23 in a reciprocating motion toward and away from the needle guide 13. Two fastening means 28 and 29 which may comprise nuts are used to attach the print wire 22 to the tongue 23 and a spring 30 is located between the fastener 28 and the tongue 23. The spring acts as a coupling between the reciprocating tongue 23 and the print wire 22.

A brake mechanism 31 is provided along the printing needle 22 between the nut 28 and the needle guide 13. The brake mechanism comprises a brake driver 32 which is attached at one end to a suitable portion of the housing 21 and at the other end to a clamping shoe 33. An abutment 34 is attached to the housing 21 at a position so as to be opposite the clamping shoe 33. The needle printing element 22 passes between the abutment 34 and the clamping shoe 33 and the space created therebetween is greater than the thickness of the needle element 22. A cable 36 is provided with leads 37 and supplies signals to the brake driver 32 from a suitable signal source, not shown. The brake driver 32 may comprise a piezoelectric element which distorts from a quiescent shape upon application of a voltage thereto in a manner which is well known in the art. It will be understood that the housing 21 contains an array of print wires and a brake mechanism for each of the print wires.

Figure 3:
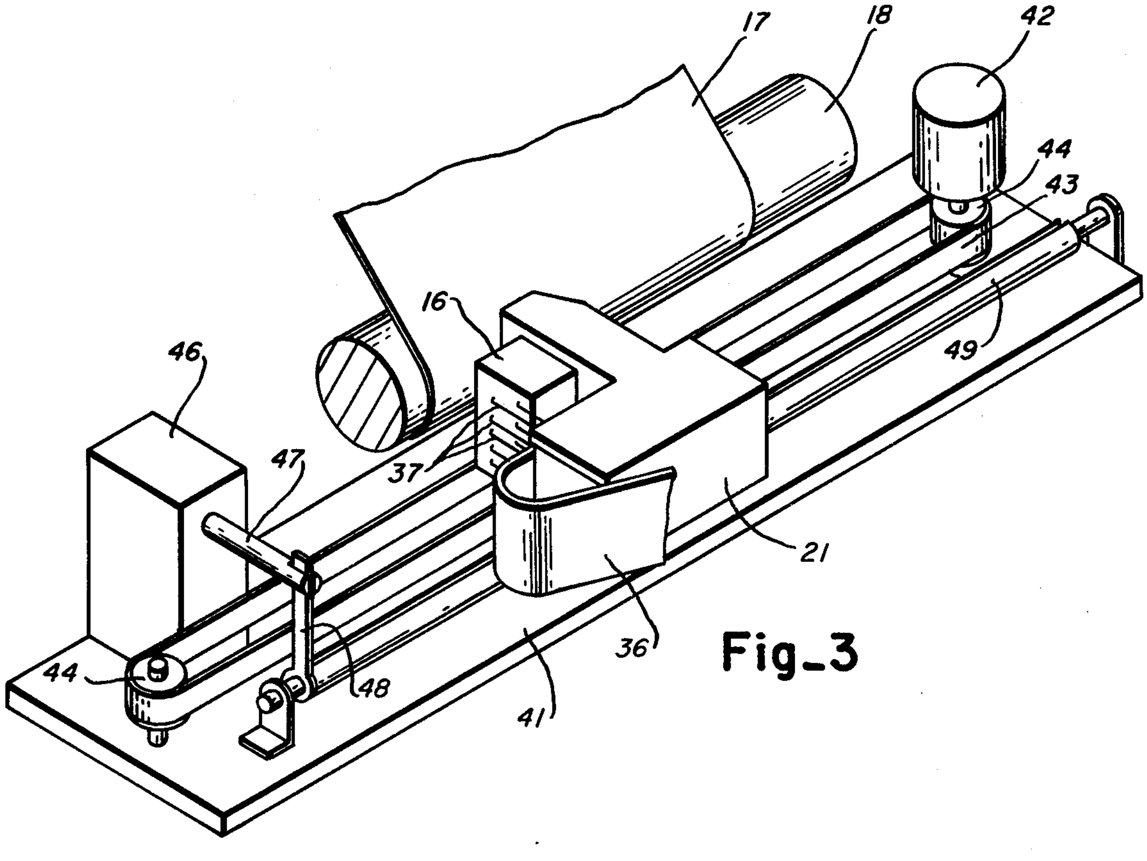
FIG. 3 is a perspective view of a needle printing head mounted for motion across a record carrier.

Turning now to FIG. 3, it will be seen that the needle housing 21 is mounted by means of a slotted shaft on a platform 41 so as to be movable transversely across the surface of the recording medium 17. This reciprocation can be caused by means well known in the art, and in the instant embodiment is provided by a motor 42 which drives a belt 43 in a back and forth motion between two pulleys 44. The housing 21 is attached to the belt 43 by suitable means and proper control of the motor 42 and the belt 43 causes the printing element to traverse the recording medium 17 in a desired manner.

A motive means 46 is likewise mounted to the platform 41 and is operative to reciprocate a plunger 47 in order to swing an arm 48 in a back and forth motion. The motion of the arm 48 is transmitted to the slotted shaft 49, and suitable mechanical connection may be made between the rocking shaft 49 and the oscillator 27 shown in FIG. 2 to cause a nutating motion thereof. This nutating motion is transmitted by means of the tongue 23 to the print wires which comprise the array 12.

Figure 5:
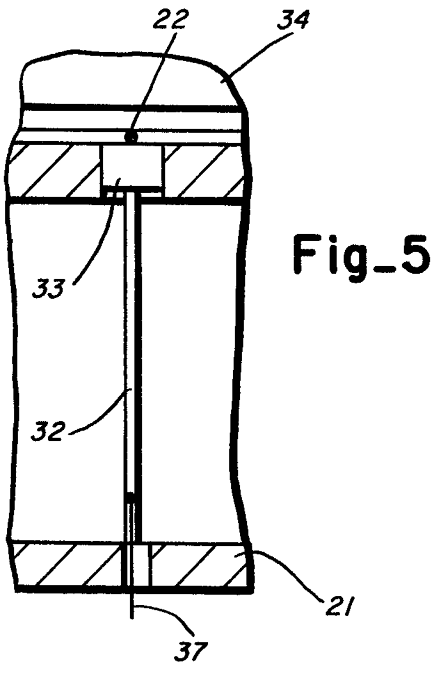

Turning now to FIGS. 4 and 5, an embodiment of a brake mechanism is shown in which the brake driver 32 comprises an elongated element of piezoelectric material which has been mechanically deformed into an arcuate shape. It will be seen that a space 51 is created between the abutment 34 and the clamping shoe 33 which allows the needle wire 22 to pass therebetween without a dragging force being exerted thereon by the clamping shoe 33 and the abutment 34. It will be understood that application of suitable voltage by means of the leads 37 to the element 32 will cause a straightening thereof, which straightening will move the clamping shoe 33 to the abutment 34 through a distance which will diminish the space 51 and cause a braking effect on the needle wire 22 as shown in FIG. 5.

The operation of the device will be apparent to those skilled in the art. The motor 42 together with the belt 43 causes the needle housing 21 to traverse the record carrier 17 in a conventional back and forth manner. As the housing 21 is laterally displaced, the motive means 46 causes a periodic motion of the oscillator 27 to drive the print wires 22 into the printing ribbon 14 causing a mark to be placed on the recording medium 17. The reciprocating motion of the tongue 23 is transmitted to the print wire 22 through the coupling action of the spring 30 bearing on the nut 28 which is fixed to the wire. When the space 51 between the abutment 34 and the clamping shoe 33 is so great that the needle wire passes freely therein, the wire is caused to print on the recording medium 17. When the brake driver 32 has been energized to close the space 51 and to clamp the print wire 22 between the clamping shoe 33 and the abutment 34, the motion of the tongue 23 compresses the coupling spring 30 and the wire 22 is not displaced. In this way, the wire 22 is restrained from causing a printing mark to be made on the recording medium 17 in response to the periodic oscillation of the element 27. Through the use of the invention, a regular and periodic motion may be used to drive an array of print wires but selected wires of the array may be individually controlled.

Modification of the device as described will occur to those skilled in the art. While a vertical array of nine print wires has been shown in the drawings, a five by seven rectangular array, or vertical arrays of seven or five wires may also be used. The driving of the print wires may be accomplished by other than a reciprocating tongue driven by a shaft and an oscillating element. The brake driver may be a magnetostrictive, electrostrictive, or other device which elongates and contracts upon receipt of suitable signals thereto. Where a piezoelectric brake driver is used, the element may be straight when unexcited and may lengthen when a driving signal is applied thereto.

Other various modifications and alterations will occur to those skilled in the art, which modifications and alterations are intended to be within the scope of the present invention as defined in the appended claims.

I claim:

1. In a mechanism for printing on a recording medium, the combination comprising:
- an array of elongated printing means for marking on the recording medium,
- a guide is proximal relation to the recording medium for receiving the elongated printing means,
- reciprocating means for driving said elongated printing means toward said recording means, said elongated printing means extending in a substantially straight line from said reciprocating means to said guide,
- yieldable means for coupling motion of said reciprocating means to said elongated printing means, and
- an array of selectively actuated braking means corresponding in number to the number of elongated printing means, each of said braking means comprising a piezoelectric brake driver, a braking surface, and an abutment, wherein the piezoelectric brake driver selectively causes the braking surface to directly clamp the elongated printing means against the abutment preventing the yieldable means from coupling motion from the reciprocating means to the elongated printing means.

2. The combination of claim 1 further comprising:
- a tongue comprising said reciprocating means, said tongue having a fixed end and a free end, an oscillating means for driving said tongue, said oscillating means being in contact with the free end of said tongue, and a spring comprising said means for coupling, said spring being in contact with said reciprocating means and said printing means.

3. The combination of claim 2 wherein said spring comprises a coiled compression spring.

4. The combination of claim 3 wherein said brake driver comprises piezoelectric material.

5. A mechanism for printing a recording medium, the mechanism comprising:

an array of elongated printing needles, a needle guide for receiving one end of each of said printing needles, a reciprocating means for driving each of said printing needles, said printing needles extending in a substantially straight line from the needle guide to the reciprocating means, an oscillator for driving each of said reciprocating means, a yieldable coupling for transmitting motion from said reciprocating means to said printing needles, and a brake for clamping directly upon each of said printing needles, wherein said brake, when energized, prevents the yieldable coupling from transmitting motion from said reciprocating means to said printing needles.

6. The mechanism of claim 5 further comprising:

a coil spring comprising said yieldable coupling, and a piezoelectric element comprising said brake, said piezoelectric element having a curved shape before application of an excitation signal thereto.

7. The mechanism of claim 6 further comprising:

nutating eccentric comprising said oscillator, and a tongue comprising said reciprocating means, said tongue having a fixed end and a free end.

* * * * *